United States Patent
Nogami et al.

(10) Patent No.: US 8,361,218 B2
(45) Date of Patent: Jan. 29, 2013

(54) COLORING COMPOSITION, METHOD FOR PRODUCTION THEREOF, AND COLORING METHOD

(75) Inventors: Atsushi Nogami, Chuo-ku (JP); Toshiyasu Fujita, Chuo-ku (JP); Masanori Takakamo, Chuo-ku (JP); Shigeru Sakamoto, Chuo-ku (JP); Michiei Nakamura, Chuo-ku (JP)

(73) Assignee: Dainischiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 12/799,933

(22) Filed: May 5, 2010

(65) Prior Publication Data

US 2010/0291359 A1 Nov. 18, 2010

Related U.S. Application Data

(63) Continuation of application No. PCT/JP2008/070352, filed on Nov. 7, 2008.

(30) Foreign Application Priority Data

Nov. 8, 2007 (JP) .................................. 2007-290597

(51) Int. Cl.
  *C09B 47/24* (2006.01)
(52) U.S. Cl. ........................ 106/411; 106/410
(58) Field of Classification Search .................. 106/410, 106/411
  See application file for complete search history.

(56) References Cited

U.S. PATENT DOCUMENTS

| 5,024,926 | A | | 6/1991 | Itoh et al. | |
| 5,954,870 | A | * | 9/1999 | Davies et al. | 106/411 |
| 6,197,103 | B1 | * | 3/2001 | Davies et al. | 106/410 |
| 2005/0235874 | A1 | | 10/2005 | Nakamura et al. | |

FOREIGN PATENT DOCUMENTS

| EP | 0 554 971 A2 | 8/1993 |
| GB | 1 422 834 | 1/1976 |
| JP | 49-081436 A | 8/1974 |
| JP | 1-108265 A | 4/1989 |
| JP | 2-138382 A | 5/1990 |
| JP | 7-076662 A | 3/1995 |
| JP | 2000-136333 A | 5/2000 |
| WO | WO 2008110747 A1 * | 9/2008 |

OTHER PUBLICATIONS

STN Structure Search (Jun. 20, 2012).*
European Patent Office, Extended European Search Report for European Patent Application No. EP 08 84 7382, May 4, 2012, European Patent Office, Munich, Germany.

* cited by examiner

*Primary Examiner* — Vu A Nguyen
(74) *Attorney, Agent, or Firm* — Chapman and Cutler LLP

(57) ABSTRACT

The present invention provides an image-recording/pixel-forming coloring composition containing a phthalocyanine type colorant having at least one group selected from alkyl and alkyloxy groups (alkylphthalocyanine type colorant). According to the present invention, there can also be provided a coloring composition containing a phthalocyanine type colorant capable of exhibiting excellent properties when used as an image-recording coloring composition or pixel-forming coloring composition, production processes of the phthalocyanine type colorants, a coloring method, and the like.

4 Claims, 6 Drawing Sheets

COLORING COMPOSITION, METHOD FOR PRODUCTION THEREOF, AND COLORING METHOD

TECHNICAL FIELD

This is a continuation of PCT/JP2008/070352 filed Nov. 7, 2008, and claims priority to Japan Pat. App. No. JP2007-290597 filed Nov. 8, 2007, contents of both of which are hereby incorporated herein by reference in their entirety. This relates to a coloring composition containing a phthalocyanine type colorant (pigment or dye), processes for producing the phthalocyanine type colorant, and a coloring method. More specifically, the present invention is concerned with a coloring composition making use of a phthalocyanine type colorant with from 1 to 4 groups selected from $(C_{1-18})$alkyl and $(C_{1-18})$alkoxy groups and substituted thereon (which includes its derivatives; these colorants and derivatives may hereinafter be each called simply "alkylphthalocyanine" or "alkylphthalocyanine derivative"), processes for producing the phthalocyanine type colorant, a coloring method and a colored article.

BACKGROUND ART

Phthalocyanine type pigments are sharp blue pigments having high fastness, and have conventionally been used as blue coloring agents for various printing inks, paints and plastics. Generally employed as a phthalocyanine type blue pigment is a copper phthalocyanine pigment obtainable by condensing phthalic anhydride using copper as a central metal. This pigment is polymorphic. Its α-crystalline form is unstable (metastable) in an organic solvent or under heat, undergoes a crystalline transformation, and also changes in color from a reddish blue color to a greenish blue color. On the other hand, its β-crystalline form is a stable crystalline form, but has a greenish blue color.

As a method for preventing such a change in crystallinity, it has been proposed to incorporate a copper alkylphthalocyanine, which contains one or more alkyl groups or cycloalkyl groups, at from 10 to 1.5 mole % in the copper phthalocyanine pigment. The resulting copper phthalocyanine pigment composition is described to have resistance to recrystallization and also resistance to flocculation and therefore to be suited as a blue color for various paints, printing inks, high-molecular materials, fibers, and the like (Patent Document 1).

It is also described that a composition of a copper phthalocyanine containing from 0.1 to 3 methyl groups on average per phthalocyanine skeleton exhibits anti-recrystallization properties during its storage in the presence of a solvent, and therefore, is suited for use in paints and inks and is also suited as a pigment for coloring plastic materials to be used at elevated temperatures (Patent Document 2).
Patent Document 1: JP-A-49-81436
Patent Document 2: JP-A-7-76662

However, laser copying machines, laser printers and inkjet printers have become widespread for office use and personal use in recent years, and moreover, digital printers have been recently finding utility as small business printers in combination with large offset printers. Conventionally, copper phthalocyanine blue pigments have been employed with praise as blue pigments for use as cyan colors in information recording materials such as cyan toners for laser printers and color copying machines and also in cyan inks for inkjet printers. There is, however, an increasing desire for expressions in a still broader color gamut as color printing expressions of printed characters and images, leading to an outstanding desire for a blue pigment having, as a cyan color, a more greenish color than β-copper phthalocyanine pigments.

As blue pigments for the formation of blue pixels on image display means such as color filters, reddish blue ε-copper phthalocyanine pigments are used. However, these pigments are a little unstable in solvents or under heat, and therefore, require additives (pigment derivatives) for inhibiting crystalline transformation and crystal growth of the pigments.

By substituting 1 to 2 halogen atoms such as chlorine atoms on each phthalocyanine skeleton, the transformational growth properties of crystals of the pigment are inhibited. As a result, however, its color tone changes to a greenish blue color. The above-described halogenated copper phthalocyanine is, therefore, insufficient as an additive (pigment derivative) to be incorporated in a reddish blue pigment. Accordingly, there is an outstanding desire for a phthalocyanine type pigment, which is stable in organic solvents and under heat, does not undergo much crystalline transformation, has a reddish blue color, and does not undergo much changes in color.

DISCLOSURE OF THE INVENTION

Problem to Be Solved by the Invention

Objects of the present invention are, therefore, to provide a coloring composition containing a phthalocyanine type colorant capable of exhibiting the below-described characteristics when used as an image-recording coloring composition or a pixel-forming coloring composition, production processes of the phthalocyanine type colorant, a coloring method, and so on.

(1) To present a characteristic, greenish or reddish color tone different from conventional phthalocyanine pigments.

(2) To be resistant to crystallinity changes in an organic solvent or under heat, to be free from substantial changes in color hue even if the crystallinity changes, to be free from substantial changes in the particle size of the pigment particles, and to be excellent in physical properties such as dispersion stability when used in a pigment dispersion.

(3) Upon production of the phthalocyanine type blue pigment and the above-described coloring composition, to contribute to an improvement in the stability of crystals of the pigment in an organic solvent or during heating and kneading of a resin with the pigment added therein or to contribute to an improvement in the stability with time of dispersion properties, viscosity and the like of a solvent dispersion.

(4) To be able to provide a water-soluble phthalocyanine type dye having a reddish blue color or greenish blue color.

Means for Solving the Problem

The present inventors have enthusiastically proceeded with research with a view to achieving the above-described objects of the present invention. As a result, it has been found that phthalocyanine type pigments having from 1 to 4 groups selected from alkyl and alkyloxy groups can present blue colors having different color tones depending on the numbers of the substituent group(s), are inhibited in transformational growth properties of crystals even in organic solvents or under heat and do not undergo much changes in color hue, and that their sulfonated or phthalimidomethylated derivatives present sharp blue colors, leading to the completion of the present invention.

Described specifically, the present invention provides an image-recording/pixel-forming coloring composition comprising a phthalocyanine type colorant having at least one group selected from alkyl and alkyloxy groups (alkylphthalocyanine type colorant). The composition may further comprise at least one of a dilution medium and a film-forming material.

In the present invention as described above, the phthalocyanine type colorant may preferably be substituted by 1 to 4 groups selected from $(C_{1-18})$ alkyl and $(C_{1-18})$ alkyloxy groups; and the alkylphthalocyanine may preferably have a central element selected from hydrogen, copper, cobalt, nickel, titanium, tin, zinc, iron, magnesium, aluminum, lithium, sodium and silicon.

In the present invention as described above, the alkylphthalocyanine type colorant may preferably have at least one group or atom selected from sulfonic, phthalimidomethyl, carboxyl and amino groups and halogen atoms. The alkylphthalocyanine may be insoluble, water-soluble or solvent-soluble. In the foregoing, the alkylphthalocyanine and the alkylphthalocyanine derivative may be at least one of a mixture thereof and a mixed crystal substance thereof.

In the present invention as described above, the dilution medium may be at least one medium selected from liquid media consisting of organic solvents, mixed solvents of organic solvents and water, water, liquid polymers, liquid oligomers, liquid monomers and liquid plasticizers or from solid media consisting of synthetic resins, natural resins, solid polymers, solid oligomers, solid monomers and solid plasticizers; and the film-forming material may comprise at least one film-forming material selected from polymers, oligomers, monomers and crosslinking agents, each of which may contain one or more reactive groups.

The composition according to the present invention as described above is useful as a recording composition for electrophotographic copying machines, a recording composition for electrophotographic digital printers, a recording composition for electrostatic printing, an inkjet ink, an ink for stationeries, or a pixel-forming ink for color filters.

The composition according to the present invention as described above may preferably be a mixture of (A) a copper phthalocyanine pigment and (B) an alkylphthalocyanine type pigment and/or its derivative. The copper phthalocyanine pigment (A) may preferably be an α-, β- or ε-copper phthalocyanine pigment, and the alkylphthalocyanine type pigment and/or its derivative (B) may preferably be at least one alkylphthalocyanine type colorant selected from copper mono- to tetra-methylphthalocyanines, and sulfonated derivatives, carboxylic acid derivatives, aminated derivatives and phthalimidomethylated derivatives thereof. The mixing weight ratio of (A) to (B) may preferably be from 2 to 100 parts by weight of (B) per 100 parts of (A).

The composition according to the present invention as described above may preferably be a mixture of (A) an alkylphthalocyanine and (B) a derivative thereof. The alkylphthalocyanine (A) may preferably be at least one of copper mono- to tetra-methylphthalocyanine colorants, and the derivative may preferably be at least one of copper mono- to tetra-methylphthalocyanine colorants having at least one of sulfonic, carboxyl, amino and phthalimidomethyl groups. The mixing weight ratio of (A) to (B) may preferably be from 2 to 100 parts by weight of (B) per 100 parts of (A).

Further, the present invention also provides a method for coloring an article, which comprises using the image-recording/pixel-forming coloring composition according to the present invention. In the method, a coloring method may be selected from electrophotographic copying, digital electrophotographic printing, electrostatic photographic printing, inkjet printing, writing, and pixel formation for a color filter. The present invention also provides a colored article obtainable by the coloring method.

In addition, the present invention also provides a process for producing an alkylphthalocyanine type colorant, which comprises reacting (a) at least one alkylphthalic acid selected from $(C_{1-18})$alkylphthalic acids and $(C_{1-18})$ alkyloxyphthalic acids, and anhydride, amidic acid, acid amide, acid imide, dinitrile and amino-iminoisoindolenine derivatives thereof and (b) at least one phthalic acid selected from phthalic acid and halogenated phthalic acids, and anhydride, amidic acid, acid amide, acid imide, dinitrile and amino-iminoisoindolenine derivatives thereof at a molar ratio of a:b=100:0 to 1:99; and also, a process for producing an alkylphthalocyanine derivative, which comprises sulfonating, phthalimidomethylating, halogenating or aminating an alkylphthalocyanine having from 1 to 4 groups selected from $(C_{1-18})$ alkyl and $(C_{1-18})$ alkyloxy groups.

Advantageous Effects of the Present Invention

Phthalocyanine pigments are sharp blue pigments of high fastness, and have been used with praise as blue colorants for various applications, such as colorants for inks, paints and plastics, and also as pigments useful as blue colors in display means and recording compositions. However, these phthalocyanine pigments are polymorphic. Their α-forms are unstable in organic solvents or under heat and undergo crystalline transformation, and further, they change in color from a reddish blue color to a greenish blue color. Their β-forms are stable, but they have a greenish blue color. Their ε-forms have a reddish blue color but are a little unstable, and therefore, require additives (pigment derivatives) for the inhibition of color changes by crystalline transformation and coarsening of pigment particles by crystalline growth.

In contrast, the alkylphthalocyanine according to the present invention presents a distinctive greenish blue color as the number of the introduced alkyl group(s) becomes greater, and this color hue is suited as a cyan color or sky blue color capable of meeting an enlargement of the color gamut, said enlargement being required for dry developers and wet developers used in digital laser printers of the full-color electrophotographic system and full-color copying machines and also for inkjet inks used in inkjet printers. The water-soluble derivative synthesized from the alkylphthalocyanine also has a blue color of a substantially similar color tone as the starting alkylphthalocyanine, and is suited as a water-based blue ink for inkjet printers.

The pigment composition prepared by adding the alkylphthalocyanine derivative, which is insoluble in water or insoluble in organic solvents, to the copper phthalocyanine pigment has merits that it is relatively stable in organic solvents or under heat, no substantial change is observed on its crystalline form, and its blue color tone does not change much.

The alkylphthalocyanine according to the present invention, in which the number of the introduced alkyl group(s) is small, presents a reddish blue color. Therefore, its addition to an ε-copper phthalocyanine pigment employed for the formation of blue pixels on color filers for liquid crystal displays has showed an excellent tendency such that in post-processing steps such as a milling step of microparticulating the ε-pigment and a wet dispersion step for a liquid pigment coloring agent, changes in the crystallinity of the ε-pigment are inhibited and the color tone of the ε-pigment does not change much and also that improvements are made in properties governing the storage stability or the like of a dispersed liquid coloring agent, such as the particle size distribution of the dispersed pigment and the viscosity.

In the alkylphthalocyanine according to the present invention, the alkyl group or groups have been introduced onto the skeleton of phthalocyanine. The alkylphthalocyanine according to the present invention, therefore, has merits such that it has compatibility with a pigment dispersant, a resin binder, an organic dispersion medium and the like in a pigment dispersion and also that it facilitates the introduction of one or more substituents owing to the existence of the alkyl group or groups in the synthesis of the alkylphthalocyanine derivative according to the present invention.

BEST MODES FOR CARRYING OUT THE INVENTION

The present invention will next be described in further detail based on best modes for carrying it out. In general, a phthalocyanine colorant is a complex colorant, which contains a porphyrin ring as a ligand and hydrogen (non-metal), copper or the like as a central element.

About a process for the production of a phthalocyanine pigment, a description will be made taking, as an example, copper phthalocyanine pigment which is used most abundantly. According to the Wyler process which is a representative production process, phthalic anhydride, urea and a copper salt such as cuprous chloride are used as raw materials irrespective of whether it is carried out as a pressureless process or a pressure process. Additionally using ammonium molybdate, phosphomolybdic acid or the like as a condensation catalyst, a crude pigment is obtained. According to the phthalodinitrile process, phthalodinitrile and a copper salt are used as raw materials to obtain a crude pigment.

The copper phthalocyanine pigment useful as a colorant is produced by subjecting the crude pigment to purification with an acid and an alkali, water washing and if necessary, solvent washing to remove any remaining reactants and impurities and then conducting a post-processing step called "pigmentation", such as the salt milling method, the solvent salt milling method or the acid paste method. These methods are all intended to perform microparticulation of the crude pigment and/or the conversion, control or adjustment of its crystalline form, and one of them is chosen as desired depending on the application, required physical properties and the like.

The alkyl group(s) and/or alkyloxy group(s) of the alkylphthalocyanine in the present invention can be introduced by using an alkylphthalic acid or the like and/or an alkyloxyphthalic acid or the like as raw material(s) upon production of the colorant. As an alternative, the alkyl group(s) and/or alkyloxy group(s) can be subsequently introduced into the phthalocyanine type colorant which do not have such group(s). However, preferred is the former process that uses the alkylphthalic acid or the like and/or the alkyloxyphthalic acid or the like.

The alkylphthalic acid or the like and the $(C_{1-18})$alkyloxyphthalic acid or the like, which are useful in the present invention, can be alkylphthalic acids the alkyl groups of which have from 1 to 18 carbon atoms, alkyloxyphthalic acids the alkyloxy groups of which have from 1 to 18 carbon atoms, and derivatives thereof.

The derivatives of the alkylphthalic acid or the like and alkyloxyphthalic acid of the like can include derivatives such as anhydrides (alkyl- and alkyloxy-phthalic anhydrides), amidic acids (alkyl- and alkyloxy-phthalamic acids), acid-amides (alkyl- and alkyloxy-phthalamides), acid-imides (alkyl- and alkyloxy-phthalimides), dinitriles (alkyl- and alkyloxy-phthalodinitriles), and amino-iminoisoindolenines (alkyl- and alkyloxy-amino-iminoisoindolenines) of such phthalic acids. These alkylphthalic acids, alkyloxyphthalic acids and derivatives will hereinafter be called "alkylphthalic acids and the like".

Particularly preferred as the alkyl group are methyl and ethyl groups. Specific examples can include 4-methylphthalic acid and the like, 3-methylphthalic acid and the like, 4-ethylphthalic acid and the like, 3-ethylphthalic acid and the like, 4-methoxyphthalic acid and the like, and 4-ethoxyphthalic acid and the like. Among these, 4-methylphthalic acid and the like are particularly preferred.

The alkylphthalic acid (a) useful for the synthesis of the alkylphthalocyanine type colorant in the present invention can be only an alkylphthalic acid or the like as a phthalic acid raw material, and combined use of another raw material for the synthesis of a conventionally-known phthalocyanine type pigment such as phthalic anhydride is also preferred. Examples of the phthalic acid (b) other than the alkylphthalic acid include phthalic acid, mono- to tetra-halogenated phthalic acids and sulfonated phthalic acids, and their derivatives such as their anhydrides, amidic acids, acid amides, acid imides, dinitriles and amino-iminoisoindolenines. These phthalic acids and phthalic acid derivatives will hereinafter be collectively called "phthalic acids".

Although no particular limitation is imposed on the use ratio of the alkylphthalic acid (a) to the phthalic acid (b) other than the alkylphthalic acid, the alkylphthalic acid (a) and the phthalic acid (b) can be used at a molar ratio of a:b=100:0 to 1:99. Obtainable at ratios for pigments other than those synthesized with alkylphthalic acids alone include co-reaction (co-condensation) colorants between various alkylphthalic acids (a) and phthalic acids (b), and mixtures, mixed crystal substances and eutectic crystal substances of such co-reaction colorants and alkylphthalocyanines prepared from phthalic acids (b) alone. In particular, an alkylphthalocyanine composed primarily of a monoalkylphthalocyanine and synthesized by using an alkylphthalic acid (a) and a phthalic acid (b) at a molar ratio of a:b=approx. 1:3 presents a color hue of a reddish blue color and, even when used as a raw material for a derivative to be mentioned subsequently herein, retains the color hue of reddish blue color and shows preferable results.

On the other hand, an alkylphthalocyanine composed primarily of a tri- to tetra-alkylphthalocyanine and synthesized by using an alkylphthalic acid (a) and a phthalic acid (b) at a molar ratio of a:b=approx. 3:1 to 4:0 presents a color hue of a greenish cyan color and, even when used as a raw material for water-soluble derivatives to be described subsequently herein, shows the color hue of a greenish cyan color. These alkylphthalocyanine and water-soluble derivatives are all preferred as cyan colorants for use in information recording compositions.

As the central elements of the above-described alkylphthalocyanines in the present invention, known elements which have been used as central elements in conventionally-known phthalocyanine colorants can be used. Especially, the central elements can each be selected from hydrogen, copper, cobalt, nickel, titanium, tin, zinc, iron, magnesium, aluminum, lithium, sodium, silicon or the like, with copper, aluminum, zinc or hydrogen (non-metal) being particularly preferred.

From the alkylphthalocyanine obtained as described above, it is also possible to synthesize in a manner know per se in the art derivatives useful as additives or modifiers for pigments, water-soluble blue dyes or oil-soluble dyes. Specific useful pigment derivatives include derivatives with one or more of conventionally-known substituent groups and atoms introduced therein, for example, derivatives with one or more of sulfonic groups, phthalimidomethyl groups, carboxyl groups, halogen atoms and amino groups. The degree of substitution by such substituent group(s) and/or atom(s) can be adjusted by reaction conditions. Amino-containing derivatives can include those having one or more amino groups directly introduced onto the phthalocyanine skeleton as known conventionally, and in addition, those having one or more amino groups each of which has been introduced via another atom or atom group (connecting group).

Amino groups include aliphatic amino groups and alicyclic amino groups (hereinafter called "aliphatic amino groups"), such as ($C_{1-10}$)alkylamino groups, dialkylamino groups, a cyclohexylamino group, a piperidinyl group, N-alkylpiperazinyl groups and a morpholinyl group. Connecting groups include known connecting groups such as a methylene group, a sulfamido (aminosulfonyl) group, an ester (oxycarbonyl) group, a urethane group, a urea group and s-triazine group, with a methylene group and a sulfamido group being preferred. Particularly preferred are an aliphatic aminomethyl group with an aliphatic amino group bound via a methylene group and an aliphatic aminoalkylaminosulfonyl group with an aliphatic aminoalkyl group bound via an aminosulfonyl group.

On the other hand, a carboxyl group can be introduced by a known method. For example, a carboxyl group can be introduced as a solubilizing group by saponifying a phthalimidomethyl group or trimellitimidomethyl group, which has been introduced into an alkylphthalocyanine, into a phthalmonoamidomethyl group or trimellito-monoamidomethyl group.

Upon producing the copper phthalocyanine pigment as described above or upon using the copper phthalocyanine pigment in various applications, the above-described alkylphthalocyanine derivative can be added, for example, to inhibit the crystalline transformation of copper phthalocyanine pigments, to inhibit their crystal growth, to make improvements in their dispersibility and to make improvements in their heat resistance. Especially when the alkylphthalocyanine derivative has been prepared into a pigment composition by adding it to a phthalocyanine pigment crude (crude pigment) or a coarse particulate pigment, the pigment composition is effective for the post-processing (pigmentation treatment) of the phthalocyanine pigment as described above. Further, the alkylphthalocyanine derivative can also bring about excellent effects for improving the dispersion performance, storage stability and the like of a liquid dispersion color of the phthalocyanine pigment.

Moreover, a colorant mixture of two or more of the above-described alkylphthalocyanines, the above-described alkylphthalocyanine derivatives and the like can also be used as a coloring agent. The mixture can exist in various forms, including a particulate mixture of different kinds of fine particulate colorants mixed together, a mixed particulate material with different kinds of colorants existing together in each particle, and a mixed crystal substance with two or more different kinds of colorants forming mixed crystals.

The above-described alkylphthalocyanine is useful, like conventional pigments and dyes, as a colorant relating to various information technologies, for example, as an image-recording coloring composition or a pixel-forming coloring composition. The alkylphthalocyanine-containing coloring composition according to the present invention may preferably contain a dilution medium and/or a film-forming material as before.

The alkylphthalocyanine-containing coloring agent according to the present invention is used, for example, as a coloring agent for color resists useful in the fabrication of color filters, a liquid developer for printers of the electrophotographic system, a liquid coloring agent for an inkjet ink, or a dry developer for printers of the electrophotographic system. As dilution media and film-forming materials in these applications, conventionally-known liquid solvents and resin components can be used. Depending on each application, use condition and resin component to be used, a liquid solvent is selectively determined. A conventionally-known organic solvent, a mixed solvent of water and a hydrophilic solvent, water or the like may be used.

As a resin to be used as a film-forming material, a conventionally-known resin component is selectively used depending on each application. Examples include known film-forming materials such synthetic rubber resins, acrylic resins, vinyl resins, chlorinated rubber resins, alkyd resins, urethane resins, epoxy resins, silicone resins and fluorinated resins; and radiation-curable, film-forming materials such as ultraviolet curable resins and electron beam curable resins.

The film-forming material may or may not have one or more reactive groups. Examples of such reactive groups include methylol groups, alkylmethylol groups, isocyanate groups, masked isocyanate groups, and epoxy groups. Depending on the application, an oligomer or monomer may be used, and further, a crosslinking agent, for example, a methylolmelamine type, isocyanate type or epoxy type crosslinking agent may also be used in combination.

In the above-described coloring agent, the mixing weight ratio of the pigment (P) to the film-forming material (V) can be determined as desired depending on the application, the required properties and the like, but may be P:V=80:20 to 1:99, with from 70:30 to 10:90 being preferred.

A material or article to be colored with the coloring agent according to the present invention can be determined by itself depending on the purpose of the coloration or the application, and can be a material or article known to date. Illustrative are image-recording coloring compositions such as full color toners for digital laser printers or full-color copying machines and color inks for inkjet printers, and articles to be colored by these compositions include, for example, paper, synthetic paper, nonwoven paper, plastic films, and the like. Concerning pixel-forming compositions for color filters in liquid crystal displays and for advertisement displays, on the other hand, articles to be colored with such pixel-forming compositions include, for example, glass substrates, plastic substrates, and the like.

In the present invention as described above, particularly preferred embodiments are as follows:

(1) The mono- to tetra-methylphthalocyanines according to the present invention and copper phthalocyanine pigments containing the mono- to tetra-methylphthalocyanines are useful as colorants for inkjet inks and electrophotographic developers (Examples 1, 3 and 6).

(2) The sulfonated alkylphthalocyanines according to the present invention vary in application depending on the numbers of sulfonic group(s) introduced therein. Described specifically, for an application as a water-soluble dye in a colorant for a water-based inkjet ink, the number of sulfonic group(s) per molecule may be preferably from 0.7 to 4, more preferably from 0.7 to 2.5 (Examples 4 and 5). Sulfonated alkylphthalocyanines having from approx. 0.5 to 1.5 sulfonic groups per molecule are useful as additives upon pigmentation treatment of copper phthalocyanine pigments.

(3) The alkylphthalocyanines, sulfonated alkylphthalocyanines, aminated alkylphthalocyanines and phthalimidomethylated alkylphthalocyanines according to the present invention are useful as additives upon pigmentation treatment of α-, β- or ε-copper phthalocyanines (Example 7). The resulting pigments are useful especially for the formation of pixels on color filters. In particular, an alkylphthalocyanine can be obtained as a mixture of the alkylphthalocyanine and a copper phthalocyanine by adjusting raw materials upon synthesis of the copper phthalocyanine.

The above-described alkylphthalocyanines, sulfonated alkylphthalocyanines, aminated alkylphthalocyanines and phthalimidomethylated alkylphthalocyanines can be used either singly or in combination, and the amount of such an alkylphthalocyanine or alkylphthalocyanines to be added may preferably be from approx. 2 to 100 parts by weight per 100 parts by weight of the phthalocyanine pigment. In each of the aminated alkylphthalocyanines, the number of the amino group(s) may preferably range from approx. 0.5 to 3 per molecule. In each of the phthalimidomethylated alkylphthalocyanines, the number of the phthalimidomethyl group (s) may preferably range from approx. 0.5 to 3 per molecule.

Suited as colorants for water-based inkjet inks are alkylphthalocyanine dyes, which are each obtainable by saponifying an alkylphthalocyanine colorant having from approx. 2 to 3 phthalimidomethyl groups or trimellitimidomethyl groups introduced per molecule and containing a like number of phthalo-monoamidomethyl group(s) or trimellito-monoamidomethyl group(s), each having a carboxyl group as a solubilizing group, per molecule.

EXAMPLES

The present will next be described more specifically based on examples and comparative examples. It should, however, be borne in mind that the present invention is not limited to these examples. It is to be noted that in the examples and comparative examples, all parts and percentages are on a weight basis.

Production Example 1

(1) Provided was a reactor equipped with an electrical heater as a heating device, a stirrer, a reagent inlet and a reflux condenser. In the reactor, 4-methylphthalic acid anhydride (27.4 parts), phthalic acid anhydride (75 parts), urea (155 parts) and ammonium molybdate (0.5 parts) were added to an aromatic solvent of high boiling point (300 parts), and the resulting mixture was gradually heated under stirring. At 150° C., cuprous chloride (18 parts) was added to the reactor, followed by heating to 175° C. At that temperature, a reaction was conducted for 4 hours. Subsequent to the reaction, the thus-obtained reaction product was collected by filtration, washed with methanol, treated with a dilute acid and then with a dilute aqueous alkaline solution, collected by filtration, washed with water, and then dried to obtain a copper monomethylphthalocyanine pigment crude (A-1) (88.8 parts). An X-ray diffraction diagram of the thus-obtained copper monomethylphthalocyanine pigment crude (A-1) is shown in FIG. 1. The X-ray diffraction diagram shows a peak of high diffraction intensity at a diffraction angle (2θ) of 6.90°, and also shows small diffraction peaks at 9.7° and 15.5°.

(2) An aliquot (30 parts) of the copper monomethylphthalocyanine pigment crude (A-1) obtained in Production Example 1 (1) was added in portions to 95% sulfuric acid (300 parts) under stirring to dissolve the crude (A-1). After stirred at 70° C. for 1 hour, the solution was gradually poured into iced water (3,000 parts) to cause the pigment to precipitate. The resulting precipitates were collected by filtration, washed with water, and then dried to obtain a purified copper monomethylphthalocyanine pigment (A-2) (29.4 parts). An X-ray diffraction diagram of the thus-obtained copper monomethylphthalocyanine pigment (A-2) is shown in FIG. 2. The X-ray diffraction diagram shows a peak of relatively high diffraction intensity at a diffraction angle (2θ) of 6.58°, and also shows broad diffraction peaks at 14.5°-16.0° and 24.2°-27.1°.

Production Example 2

An aliquot (10 parts) of the copper monomethylphthalocyanine pigment crude (A-1) obtained in Production Example 1(1) was added in portions to a mixture of 95% sulfuric acid (40 parts) and 20% fuming sulfuric acid (60 parts) under stirring to dissolve the crude (A-1). After stirred at 70° C. for 4 hours, the solution was gradually poured into iced water (1,000 parts) to cause the pigment to precipitate. The resulting precipitates were collected by filtration, washed with water, and then dried to obtain a sulfonated copper monomethylphthalocyanine colorant (A-3) (10.9 parts) having 0.8 sulfonic group on average per molecule.

Production Example 3

(1) An aliquot (10 parts) of the copper monomethylphthalocyanine pigment crude (A-1) obtained in Production Example 1 (1) and hydroxymethylphthalimide (6 parts) were added in portions to 95% sulfuric acid (100 parts) under stirring to dissolve the crude (A-1) and hydroxymethylphthalimide. After stirred at 80° C. for 7 hours, the solution was gradually poured into iced water (1,000 parts) to cause the pigment to precipitate. The resulting precipitates were collected by filtration and washed with water, and were then treated with an aqueous solution of sodium carbonate. Remaining reactants and decomposition products were filtered off, and the resulting precipitates were washed with water and dried to obtain a phthalimidomethylated copper monomethylphthalocyanine colorant (A-4) (12.5 parts) having 1.0 phthalimidomethyl group on average per molecule.

(2) An aliquot (15 parts) of the copper monomethylphthalocyanine pigment crude (A-1) obtained in Production Example 1(1) and an aliquot (0.5 parts) of the phthalimidomethylated copper monomethylphthalocyanine colorant (A-4) obtained in Production Example 3(1) were milled together with steel balls (500 parts) and nails (50 parts) for 3 hours in an oscillating mill. The resulting contents were taken out, subjected to pigmentation by solvent finishing, subjected to treatment with a dilute acid, washed with water, and then dried to obtain a copper monomethylphthalocyanine pigment (A-5) (14.7 parts). An X-ray diffract ion diagram of the thus-obtained copper monomethylphthalocyanine pigment (A-5) is shown in FIG. 3. The X-ray diffraction diagram shows a peak of high diffraction intensity at a diffraction angle (2θ) of 6.84°, and also shows small diffraction peaks at 9.70° and 15.4° and a broad diffraction peak at 24.9°-27.3°.

Production Example 4

By a similar procedure as in Production Example 2, the copper monomethylphthalocyanine pigment crude (A-1) was sulfonated to obtain a sulfonated copper monomethylphthalocyanine dye (A-6) having approx. 2.5 sulfonic groups per molecule.

Production Example 5

Following a procedure commonly employed for the aminomethylation reactions of copper phthalocyanine pigments, paraformaldehyde was reacted with the copper monomethylphthalocyanine pigment crude (A-1) to methylolate the latter. 3-Dimethylaminopropylamine was next reacted to obtain an aminated copper phthalocyanine colorant (A-7) having approx. two 3-dimethylaminopropylaminomethyl groups introduced per molecule.

Production Example 6

(1) By a similar procedure as in Production Example 1 (1), 4-methylphthalic acid anhydride (109.6 parts), urea (155 parts) and ammonium molybdate (0.5 parts) were added to an aromatic solvent of high boiling point (300 parts). At 150° C., cuprous chloride (18 parts) was added to the reactor, followed by heating to 175° C. While heated up to 195° C., a reaction was conducted for 4 hours. The resulting reaction product was collected by filtration, washed with methanol, treated with a dilute acid and then with a dilute aqueous alkaline solution, collected by filtration, washed with water, and then dried to obtain a copper tetramethylphthalocyanine pigment crude (B-1) of blue color (90.1 parts). An X-ray diffraction diagram of the thus-obtained copper tetramethylphthalocyanine pigment crude (B-1) is shown in FIG. 4. The X-ray diffraction diagram shows a peak of high diffraction intensity at a diffraction angle (2θ) of 7.40°, and also shows small diffraction peaks at 10.3°, 16.1° and 26.5°.

(2) By a similar procedure as in Production Example 1 (2), the copper tetramethylphthalocyanine pigment crude (B-1) obtained in the above procedure (1) was added in place of the copper monomethylphthalocyanine pigment crude to 95% sulfuric acid to dissolve the crude (B-1). After stirred at 70° C., the solution was gradually poured into iced water to cause the pigment to precipitate. The resulting precipitates were collected by filtration, washed with water, and then dried to obtain a purified copper tetramethylphthalocyanine pigment (B-2) (29.3 parts). An X-ray diffraction diagram of the copper tetramethylphthalocyanine pigment (B-2) is shown in FIG. 5. The X-ray diffraction diagram shows a peak of high diffraction intensity with a peak apex at a diffraction angle (2θ) of 6.14°, and also shows a small broad diffraction peak at 13.3°-14.6° and a broad diffraction peak of relatively high intensity at 26.4°-26.7°.

Production Example 7

By a similar procedure as in Production Example 2, the copper tetramethylphthalocyanine pigment crude (B-1) obtained in Production Example 6 (1) was added in portions, in place of the copper monomethylphthalocyanine pigment crude, to a mixture of 95% sulfuric acid and 20% fuming sulfuric acid under stirring to dissolve the crude (B-1). After stirred at 60° C., the solution was gradually poured into iced water to cause the pigment to precipitate. The resulting precipitates were collected by filtration, washed with water, and then dried to obtain a sulfonated copper tetramethylphthalocyanine (B-3) having 0.7 sulfonic group on average per molecule.

Production Example 8

By a similar procedure as in Production Example 3(1), the copper tetramethylphthalocyanine pigment crude (B-1) obtained in Production Example 6(1), as a replacement for the copper monomethylphthalocyanine pigment crude, and hydroxymethylphthalimide were added in portions to 95% sulfuric acid under stirring to dissolve the crude (B-1) and hydroxymethylphthalimide. After stirred at 80° C., the solution was gradually poured into iced water to cause the pigment to precipitate. The resulting precipitates were collected by filtration, washed with water, and then treated with an aqueous solution of sodium carbonate. Remaining reactants and decomposition products were filtered off, and the resulting crystals were washed with water and dried to obtain a phthalimidomethylated copper tetramethylphthalocyanine colorant (B-4) having 1.2 phthalimidomethyl groups on average per molecule.

Production Example 9

By a similar procedure as in Production Example 8, N-hydroxymethyltrimellitamide was reacted in place of hydroxymethylphthalimide to obtain copper trimellitamidomethyl-tetramethylphthalocyanine having approx. 2.5 trimellitamidomethyl groups per molecule. The copper trimellitamidomethyl-tetramethylphthalocyanine was saponified with an aqueous alkaline solution. The saponification mixture was rendered acidic with acetic acid such that precipitates were allowed to settle out to obtain a trimellito-monoamidomethylated copper tetramethylphthalocyanine colorant (B-5).

Production Example 10

By a similar procedure as in Production Example 3(2), the copper tetramethylphthalocyanine pigment crude (B-1) obtained in Production Example 6(1), as a replacement for the copper monomethylphthalocyanine pigment crude, and the phthalimidomethylated copper tetramethylphthalocyanine colorant (B-4) obtained in Production Example 8 were milled together with steel balls and nails for 3 hours in an oscillating mill. The resulting contents were taken out, subjected to pigmentation by solvent finishing, subjected to treatment with a dilute acid, washed with water, and then dried to obtain a copper tetramethylphthalocyanine pigment (B-6). An X-ray diffraction diagram of the copper tetramethylphthalocyanine pigment (B-6) is shown in FIG. 6. The X-ray diffraction diagram shows a sharp peak of high diffraction intensity at a diffraction angle (2θ) of 6.38°, and also shows small diffraction peaks at 14.0°, 16.9°, 26.2° and so on.

Production Example 11

(1) Similar to the synthesis reaction in Production Example 1(1), phthalic acid anhydride (100 parts), 4-methylphthalic acid anhydride (3 parts), urea (155 parts) and ammonium molybdate (0.5 parts) were added to an aromatic solvent of high boiling point (300 parts), and the resulting mixture was gradually heated under stirring. At 150° C., cuprous chloride (18 parts) was added to the reactor, followed by heating to 175° C. At that temperature, a reaction was conducted for 4 hours. Subsequent to the reaction, the thus-obtained reaction product was collected by filtration, washed with methanol, treated with a dilute acid and then with a dilute aqueous alkaline solution, collected by filtration, washed with water, and then dried to obtain a copper phthalocyanine pigment crude (C-1) (92.2 parts) containing approx. 10% of copper monomethylphthalocyanine.

(2) By a similar procedure as in Production Example 1(2), an aliquot (92.2 parts) of the copper phthalocyanine pigment crude (C-1) obtained in Production Example 11 and containing approx. 10% of copper monomethylphthalocyanine was added in portions in place of the copper monomethylphthalocyanine pigment crude to 95% sulfuric acid under stirring to dissolve the crude (C-1). After stirred at 70° C., the solution was gradually poured into iced water to cause the pigment to precipitate. The resulting precipitates were collected by filtration, washed with water, and then dried to obtain a α-copper phthalocyanine pigment (C-2) (29.5 parts) containing copper monomethylphthalocyanine.

Production Example 12

By a similar procedure as in Production Example 4(2), the copper phthalocyanine pigment crude (C-1), which had been obtained in Production Example 11 and contained approx. 10% of copper monomethylphthalocyanine, and the phthalimidomethylated copper monomethylphthalocyanine colorant (A-4) obtained in Production Example 3(1) were milled together with steel balls and nails in an oscillating mill. The resulting contents were taken out, subjected to pigmentation by solvent finishing, subjected to treatment with a dilute acid, washed with water, and then dried to obtain a β-copper phthalocyanine pigment (C-3) containing copper monomethylphthalocyanine.

Production Example 13

An aliquot (400 parts) of the α-copper phthalocyanine pigment (C-2) obtained in Production Example 11(2) and containing copper monomethylphthalocyanine, common salt (1,600 parts) and diethylene glycol (400 parts) were milled for 6 hours in a kneader while controlling the temperature of the contents at 80 to 100° C. The resulting contents were subjected to treatment with a dilute acid and then to filtration. The thus-collected solids were washed with water, and then dried to obtain a fine β-copper phthalocyanine pigment (C-4) containing copper monomethylphthalocyanine.

Production Example 14

An aliquot (100 parts) of the α-copper phthalocyanine pigment (C-2) obtained in Production Example 11(2) and containing copper monomethylphthalocyamine, an aliquot (1 parts) of the sulfonated copper monomethyl phthalocyanine colorant (A-3) obtained in Production Example 2, an aliquot (3 parts) of the phthalimidomethylated copper monomethylphthalocyamine colorant (A-4) obtained in Production Example 3(1), an E-copper phthalocyanine pigment (Pigment Blue 15:6) (10 parts), common salt (300 parts) and diethylene glycol (110 parts) were milled for 20 hours in a kneader while controlling the temperature of the contents at 110 to 120° C. The resulting contents were subjected to treatment with a dilute acid under heating and then to filtration. The thus-collected solids were washed with water, and then dried to obtain an ϵ-copper phthalocyanine pigment composition (C-5) containing copper monomethylphthalocyanine and treated with the acidic pigment derivatives.

The phthalocyanine colorants obtained in the above-described production examples each had a sharp blue color. Their aqueous microdispersions were measured for spectral transmittance. As a result, the maximum transmission wavelength of A-2 was 485 nm, the maximum transmission wavelength of A-3 was 483 nm, the maximum transmission wavelength of A-4 was 495 nm, the maximum transmission wavelength of A-5 was 485 nm, and the maximum transmission wavelength of C-5 was 465 nm. The pigment and pigment derivatives obtained from the unsubstituted copper phthalocyanine were likewise measured for spectral transmittance. As a result, the maximum transmission wavelength of the α-copper phthalocyanine was 495 nm, the maximum transmission wavelength of the sulfonated copper phthalocyanine was 500 nm, the maximum transmission wavelength of the phthalimidomethylated copper phthalocyanine was 520 nm, the maximum transmission wavelength of the β-copper phthalocyanine was 500 nm, and the maximum transmission wavelength of ϵ-copper phthalocyanine was 470 nm.

Production Example 15

Using the aminated copper phthalocyanine colorant (A-7) obtained in Production Example 5 in place of the sulfonated copper monomethylphthalocyamine colorant (A-3) used in Production Example 14, the aminated copper phthalocyanine colorant (A-7) was subjected to milling together with the α-copper phthalocyanine pigment (C-2), which contained copper monomethylphthalocyamine, and the ϵ-copper phthalocyanine pigment in the presence of common salt and diethylene glycol by a similar procedure as in Production Example 14 to obtain an ϵ-copper phthalocyanine pigment composition (C-6) containing copper monomethylphthalocyamine and treated with the basic pigment derivative.

Example 1

An aliquot (5 parts) of the copper tetramethylphthalocyanine pigment (B-6) obtained in Production Example 10, a diethanolamine salt of a carboxyl-containing styrene-acrylate copolymer (solids content: 25%, hereinafter called "the aqueous solution-1 of water-soluble copolymer") (12 parts), ethylene glycol (22 parts), glycerin (8 parts) and water (53 parts) were dispersed in a medium-containing horizontal disperser to prepare a water-based pigment dispersion. Coarse particles of the pigment were removed by an ultracentrifuge to obtain a water-based cyan ink for inkjet printers.

By an on-demand inkjet printer, image information was printed with the above-described cyan ink to obtain an image of a sharp greenish blue color. Using a dimethylquinacridone pigment (PR-122), monoazo yellow pigment (PY-74) and carbon black pigment (PBK-7), water-based inks of red, yellow and black colors for inkjet printers were prepared, respectively, by a similar procedure as described above. Using those inks in combination with the above-described cyan ink, image information was printed by a 4-color inkjet printer to obtain a sharp, full-color inkjet print.

Example 2

Using the copper monomethylphthalocyanine pigment (A-5) obtained in Production Example 3(2) in place of the copper tetramethylphthalocyanine pigment (B-6), an aqueous pigment dispersion was obtained by a similar procedure as in Example 1. Coarse particles were removed by an ultracentrifuge to obtain a water-based cyan ink for stationery. The water-based cyan ink was filled in water-based ballpoint pen refills to obtain water-based blue ballpoint pens.

Using the copper monomethylphthalocyanine pigment (A-2) obtained in Production Example 1(2) and the copper tetramethylphthalocyanine pigment (B-2) obtained in Production Example 6(2) in place of the copper monomethylphthalocyanine pigment (A-5), a water-based cyan ink was obtained likewise. The water-based cyan ink was filled in water-based ballpoint pen refills to obtain water-based blue ballpoint pens.

Example 3

Using the fine β-copper phthalocyanine pigment (C-4), which had been obtained in Production Example 13 and contained copper monomethylphthalocyanine, in place of the copper tetramethylphthalocyanine pigment (B-6), a water-based cyan ink for inkjet printers was obtained by a similar procedure as in Example 1. By an on-demand inkjet printer, image information was printed with the above-described cyan ink to obtain a sharp image of a greenish blue color. Using the cyan ink in combination with the water-based inks of red, yellow and black colors for inkjet printers, said water-based inks of red, yellow and black colors having been obtained in Example 1, image information was printed likewise by a 4-color inkjet printer to obtain a sharp, full-color inkjet print.

Example 4

(1) The sulfonated copper tetramethylphthalocyanine (B-3) obtained in Production Example 7 was neutralized with diethanolamine and converted into a 10% aqueous dye solution. To an aliquot (30 parts) of the thus-obtained aqueous solution of the blue dye, a liquid mixture (70 parts) of the same aqueous solution-1 of water-soluble copolymer (10 parts) as that used in Example 1, ethylene glycol (10 parts), glycerin (20 parts), "SURFINOL 82" (product of Air Products, Inc.) (1 parts) and water (29 parts) was added. After thoroughly stirred, the resultant mixture was filtered through a membrane filter having a pore size of 5 micrometers to obtain a blue ink for inkjet printers.
(2) On the side, Direct Yellow 23 as a yellow dye, Acid Red 249 as a red dye, Acid Orange 56 as an orange dye, Acid Green 28 as a green dye and Food Black 2 as a black dye were provided in the forms of 10% aqueous solutions, respectively. Following the above-described preparation procedure of the blue ink for inkjet printers, a yellow ink, magenta ink, orange ink, green ink and black ink, all for inkjet printers, were prepared, respectively, by using the above-described aqueous dye solutions of the respective colors in place of the aqueous solution of the blue dye.
(3) The inks of six colors obtained in the above-described procedures (1) and (2) were filled in ink cartridges for piezoelectric inkjet printers, respectively, and a full-color photo image was printed on photographic gloss paper by a 6-color inkjet printer. The color print image was provided with sufficient print quality, and was printed as a sharp full-color photo image.

Using the trimellito-monoamidomethylated copper tetramethylphthalocyanine colorant (B-5) obtained in Production Example 9 in place of the sulfonated copper tetramethylphthalocyanine (B-3), a blue ink for inkjet printers was obtained by a similar procedure as in the above-described procedure (1). Using the blue ink as a blue ink for an inkjet printer, a sharp full-color photo image was printed.

Example 5

Using the sulfonated copper monomethylphthalocyanine dye (A-6) obtained in Production Example 4 in place of the sulfonated copper tetramethylphthalocyanine (B-3), a blue ink for inkjet printers was obtained by a similar procedure as in Example 4. Using the blue ink in combination with the yellow ink, magenta ink, orange ink, green ink and black ink obtained in Example 4(2), a full-color photo image was likewise printed on photographic gloss paper by a 6-color inkjet printer. The color print image was provided with sufficient print quality, and was printed as a sharp full-color photo image.

Example 6

An aliquot (30 parts) of the copper tetramethylphthalocyanine pigment (B-6) obtained in Production Example 10 and a polyester resin of bisphenol A-bis(propylene glycol ether) and terephthalic acid (average molecular weight: approx. 15,000) (70 parts) were kneaded by a two-roll kneader to provide a polyester master batch of the blue pigment (resin composition containing the pigment at high concentration). By a similar procedure, a dimethylquinacridone pigment (PR-122), monoazo yellow pigment (PY-74) and carbon black pigment (PBK-7) (30 parts each) were kneaded with aliquots (70 parts) of the polyester resin, respectively, to obtain polyester master batches of red color, yellow color and black color.

In accordance with the formulations in the following Table 1, the polyester master batches of the respective colors obtained as described above were next kneaded with the bisphenol-based polyester resin and a chromium-complex type based negative charge controlling agent by a usual method, respectively. The kneaded masses were separately cooled and coarsely ground, finely ground by a jet mill, and then classified by a classification apparatus to obtain fine powders of image-recording, coloring compositions of from 5 to 7 μm. Colloidal silica was added as a fluidizer, and the resulting mixtures were separately mixed with magnetic iron powder as a carrier into electrophotographic dry developers of cyan color, magenta color, yellow color and black color. Electronic printing was performed by a full-color laser printer of the electrophotographic system to obtain a sharp full-color electrophotographic print.

TABLE 1

| Materials | Cyan developer | Magenta developer | Yellow developer | Black developer |
|---|---|---|---|---|
| Blue master batch | 12 | — | — | — |
| Red master batch | — | 15 | — | — |
| Yellow master batch | — | — | 14 | — |
| Black master batch | — | — | — | 10 |
| Polyester resin | 84 | 81 | 82 | 86 |
| Chromium-complex type negative charge controlling agent | 4 | 4 | 4 | 4 |
| Total | 100 | 100 | 100 | 100 |

Example 7

After an aliquot (100 parts) of the c-copper phthalocyanine pigment composition (C-5) obtained in Production Example 14, treated with the acidic pigment derivatives and containing copper monomethylphthalocyamine, a benzyl methacrylate/methacrylic acid/2-hydroxyethyl methacrylate (molar ratio: 60/20/20) copolymer (weight average molecular weight: 30,000) (100 parts), cyclohexanone (100 parts) and propylene glycol monomethyl ether acetate (hereinafter called "PGMA") (60 parts) and "DISPERBYK 163" (product of BYK Chemie GmbH; solids content: 45%) (40 parts) were premixed in a paint conditioner, PGMA was added to give a pigment concentration of 20%. The resulting mixture was dispersed by a continuous, medium-containing, horizontal disperser.

The blue pigment microdispersion obtained as described above did not increase in viscosity at 45° C. for 1 week, and therefore, was excellent in storage stability. The blue pigment microdispersion was coated on a glass substrate by a spin coater to obtain a coated glass substrate as a blue color filter (hereinafter called "the blue color filter A"). As a result of assessments for transmittance, contrast ratio, heat resistance and light resistance, the blue color filter A was found to be excellent in all the physical properties.

Comparative Example 1

Using the 6-copper phthalocyanine pigment (C.I. Pigment Blue 15:6) in place of the ε-Copper phthalocyanine pigment composition (C-5) containing copper monomethylphthalocyanine in Example 7, the pigment was dispersed with the copolymer dispersants and solvents by using the paint conditioner and the continuous, medium-containing, horizontal disperser in a similar manner as in Example 7 to obtain a blue pigment microdispersion. The blue pigment microdispersion was similarly coated on a glass substrate by a spin coater to obtain a coated glass substrate as a blue color filter (hereinafter called "the blue color filter B").

Example 8

The blue color filter A and blue color filter B were assessed for their characteristics as blue color filters. The chromaticity (x coordinate, y coordinate) and brightness (Y value) of each of the color filters were measured by using a chromoscope (trade name: "COLOR ANALYZER TC-1800MK2"; manufactured by Tokyo Denshoku Co., Ltd.). As light for the measurements, the CIE standard illuminant C was employed. The results are shown in Table 2. The blue color filter A had a maximum transmission wavelength closer to short wavelengths, and therefore, showed a reddish blue color, and as its chromaticity, also showed a reddish blue color.

TABLE 2

|  |  | Blue color filter A | Blue color filter B |
|---|---|---|---|
| Maximum transmission wavelength (nm) | | 448 | 455 |
| Chromaticity | x coordinate | 0.1360 | 0.1351 |
|  | Y coordinate | 0.130 | 0.130 |
| Y value | | 17.1 | 16.7 |

Example 9

Separately using C.I. Pigment Green 36, C.I. Pigment Red 254, C.I. Pigment Red 177, C.I. Pigment Yellow 150 and C.I. Pigment Violet 23 in place of the s-copper phthalocyanine pigment composition (C-5) containing copper monomethylphthalocyanine in Example 7, a red pigment microdispersion-1, red pigment microdispersion-2, green pigment microdispersion, yellow pigment microdispersion and violet pigment microdispersion, each containing its corresponding pigment at 20%, were obtained by a similar procedure as in Example 7.

To form red (R), green (G) and blue (B) pixels on a glass substrate for a color filter, a photosensitive resist ink of blue color, photosensitive resist ink of green color and photosensitive resist ink of red color were obtained in accordance with the formulations in the following Table 3, respectively, by using the blue pigment microdispersion of Example 7 and the five other pigment microdispersions prepared as described above.

TABLE 3

(the values in the table are in "parts")

|  | Photosensitive resist ink of blue ink | Photosensitive resist ink of green ink | Photosensitive resist ink of red ink |
|---|---|---|---|
| Blue pigment microdispersion | 80 | — | — |
| Green pigment microdispersion | — | 60 | — |
| Red pigment microdispersion-1 | — | — | 80 |
| Red pigment microdispersion-2 | — | — | 20 |
| Yellow pigment microdispersion | — | 40 | — |
| Violet pigment microdispersion | 20 | — | — |
| Photosensitive acrylic resin varnish | 50 | 50 | 50 |
| TMPTA | 10 | 10 | 10 |
| HEMPA | 2 | 2 | 2 |
| DEAP | 1 | 1 | 1 |
| PGMA | 37 | 37 | 37 |
| Total | 200 | 200 | 200 |

In the foregoing, TMPTA stands for trimethylolpropane triacrylate, HEMPA for 2-hydroxyethyl-2-methylpropane-1-one, and DEAP for 2,2-diethoxyacetophenone.

A glass substrate which had been subjected to treatment with a silane coupling agent was mounted on a spin coater, and the photosensitive resist ink of red color was spin-coated first at 300 rpm for 5 seconds and then at 1,200 rpm for 5 seconds. Prebaking was next conducted at 80° C. for 10 minutes. Using a proximity exposure system, the coated surface of the glass substrate was exposed at a light quantity of 100 mJ/cm$^2$ through a photomask having a mosaic pattern under an ultra-high pressure mercury vapor lamp. Development and washing were then conducted with an exclusive developer and exclusive rinse, respectively, to form a mosaic pattern of red color on the glass substrate.

Following the above-described procedure, a mosaic pattern of green color and a mosaic pattern of blue color were coated with the photosensitive resist ink of green color and the photosensitive resist ink of blue color in Table 3, respectively, and were then baked to obtain an RGB color filter. The thus-obtained color filter had excellent spectral curve characteristics, was also superb in durability such as light resistance and heat resistance, also had outstanding properties in the transmission of light, and showed excellent properties as a color filter for a liquid crystal color display.

Using the ε-copper phthalocyanine pigment composition (C-6)—which had been obtained in Production Example 15, had been treated with the basic pigment derivative and contained copper monomethylphthalocyanine—in place of the ε-copper phthalocyanine pigment composition (C-5), a blue pigment microdispersion was prepared by a similar procedure as in Example 7. By a similar procedure as in Example 9, the blue pigment microdispersion was formulated into a photosensitive resist ink of blue color, and a mosaic pattern of red color, a mosaic pattern of green color and a mosaic pattern of blue color were formed on a glass substrate to obtain a three-primary-color filter. The thus-obtained color filter also had excellent spectral curve characteristics, was superb in durability and light transmission properties, and showed outstanding properties as a color filter for a liquid crystal color display.

Industrial Applicability

A phthalocyanine pigment is a sharp blue pigment of high fastness, but depending on the crystalline form, its blue color hue differs to have a reddish or greenish tinge, and depending on the crystalline form, is unstable in organic solvents or under heat and requires the addition of a pigment derivative for the inhibition of crystalline transformation and crystalline growth.

The alkylphthalocyanine according to the present invention exhibits the merits that it is relatively stable in organic solvents or under heat, its crystalline form is not observed to undergo any much change, and its blue color tone does not vary much.

The alkylphthalocyanine according to the present invention presents a distinctive greenish blue color as the number of the introduced alkyl group (s) becomes greater, and this color hue is suited as a cyan color or sky blue color for the enlargement of the color gamut, said enlargement being required for developers used in digital laser printers and for inkjet inks used in inkjet printers.

The alkylphthalocyanine, in which the number of the introduced alkyl group (s) is small, or a derivative of the pigment presents a reddish blue color, and shows excellent advantageous effects such that its addition to an ε-copper phthalocyanine pigment employed in blue pixels on a color filter for a liquid crystal display inhibits a crystalline change in a microparticulation step and also makes improvements in properties governing the storage stability and the like of a dispersed pigment, such as the particle size distribution and viscosity of the dispersed pigment, in a dispersion step thereof and its color tone also has a blue color of substantially the same tone as the starting pigment.

Owing to these excellent properties, the alkylphthalocyanine and derivatives thereof in the present invention can be used in a wide variety of applications, for example, as image-recording, coloring compositions such as full-color toners and inks for inkjet printers and pixel-forming, coloring compositions in color filters for liquid crystal displays and in advertisement displays.

Figure 1:
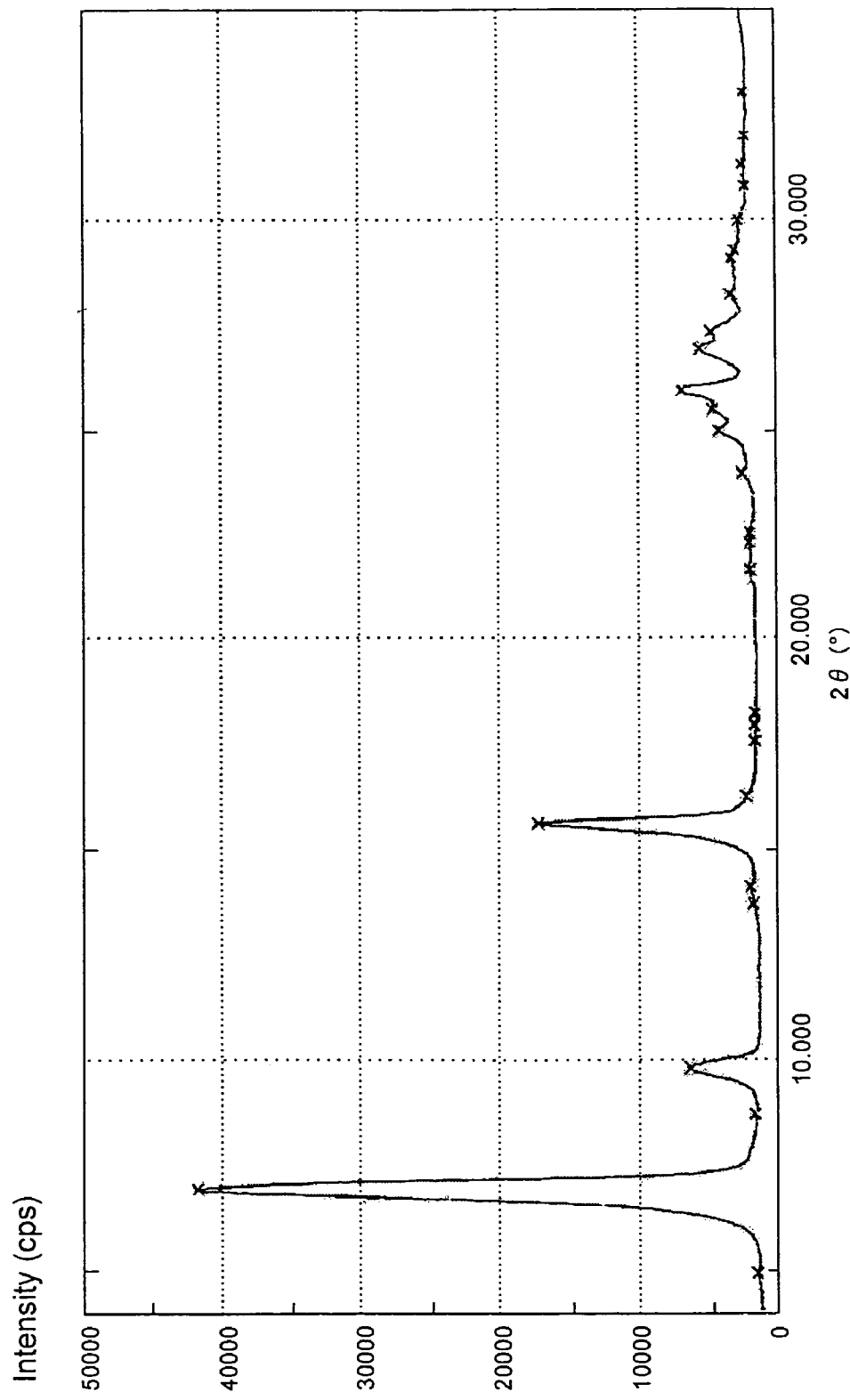
FIG. 1 An X-ray diffraction diagram of a copper monomethylphthalocyanine crude (A-1) obtained in Production Example 1(1).
Figure 2:
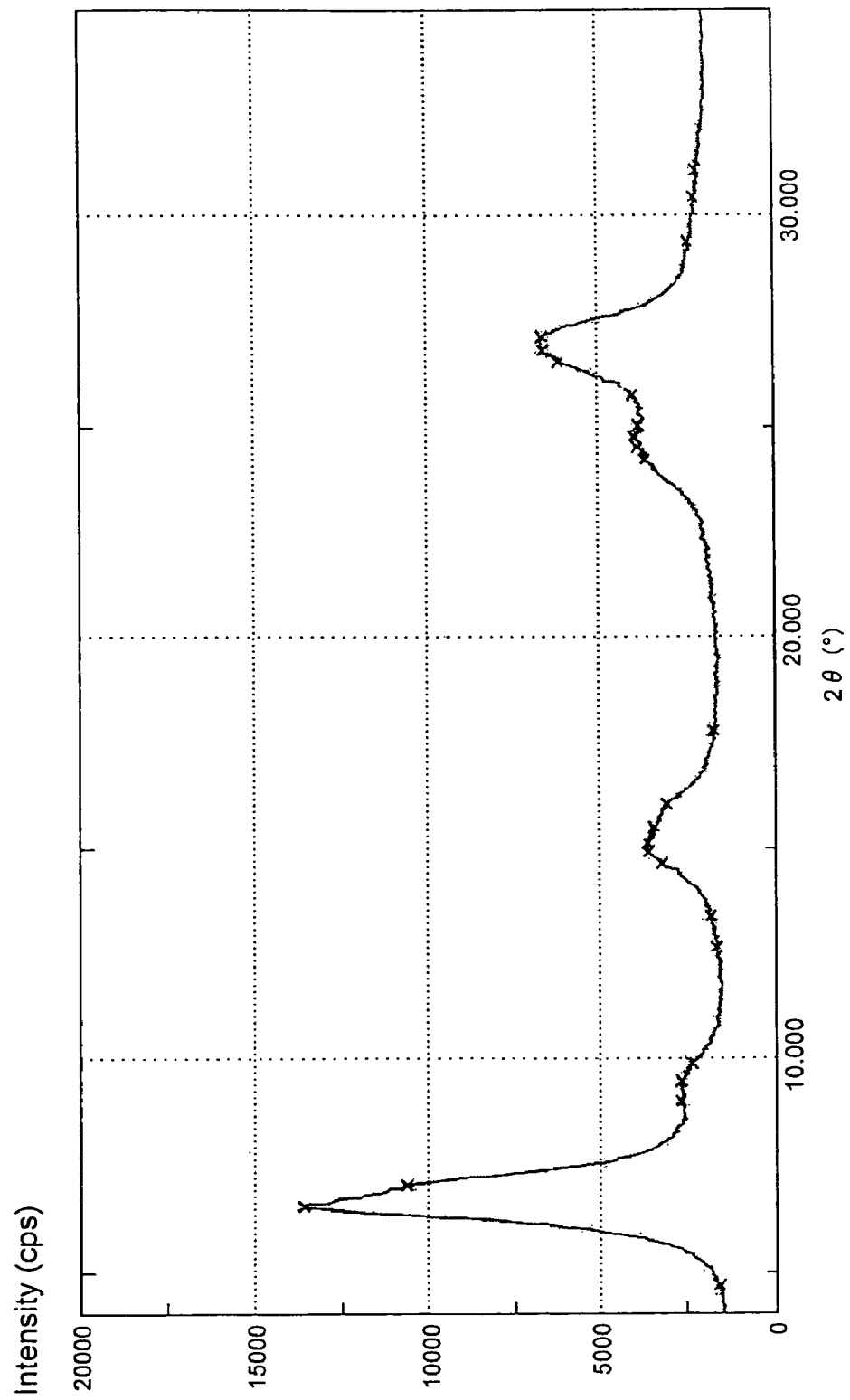
FIG. 2 An X-ray diffraction diagram of a copper monomethylphthalocyanine pigment (A-2) obtained in Production Example 1(2).
Figure 3:
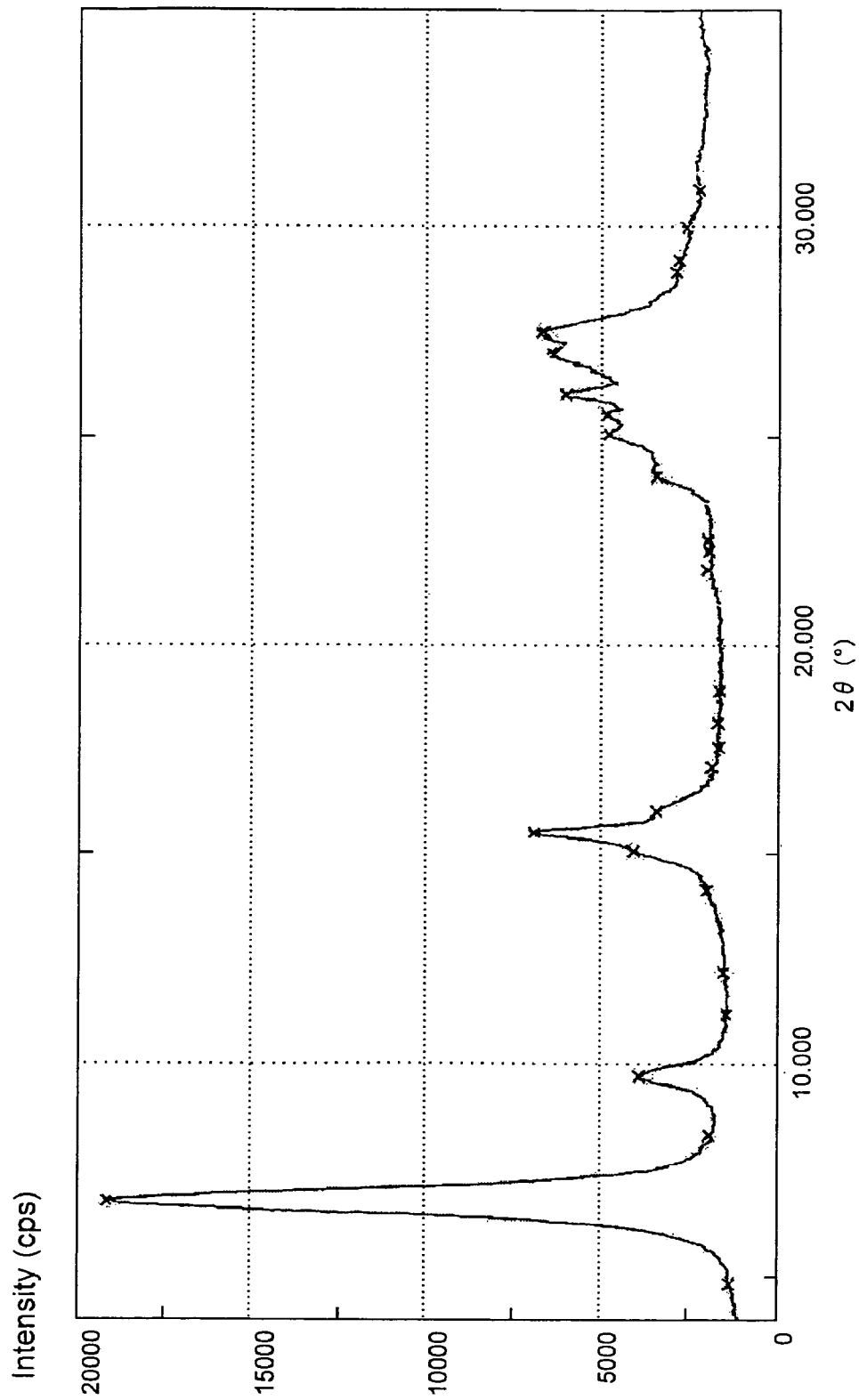
FIG. 3 An X-ray diffraction diagram of a copper monomethylphthalocyanine pigment (A-5) obtained in Production Example 3(2).
Figure 4:
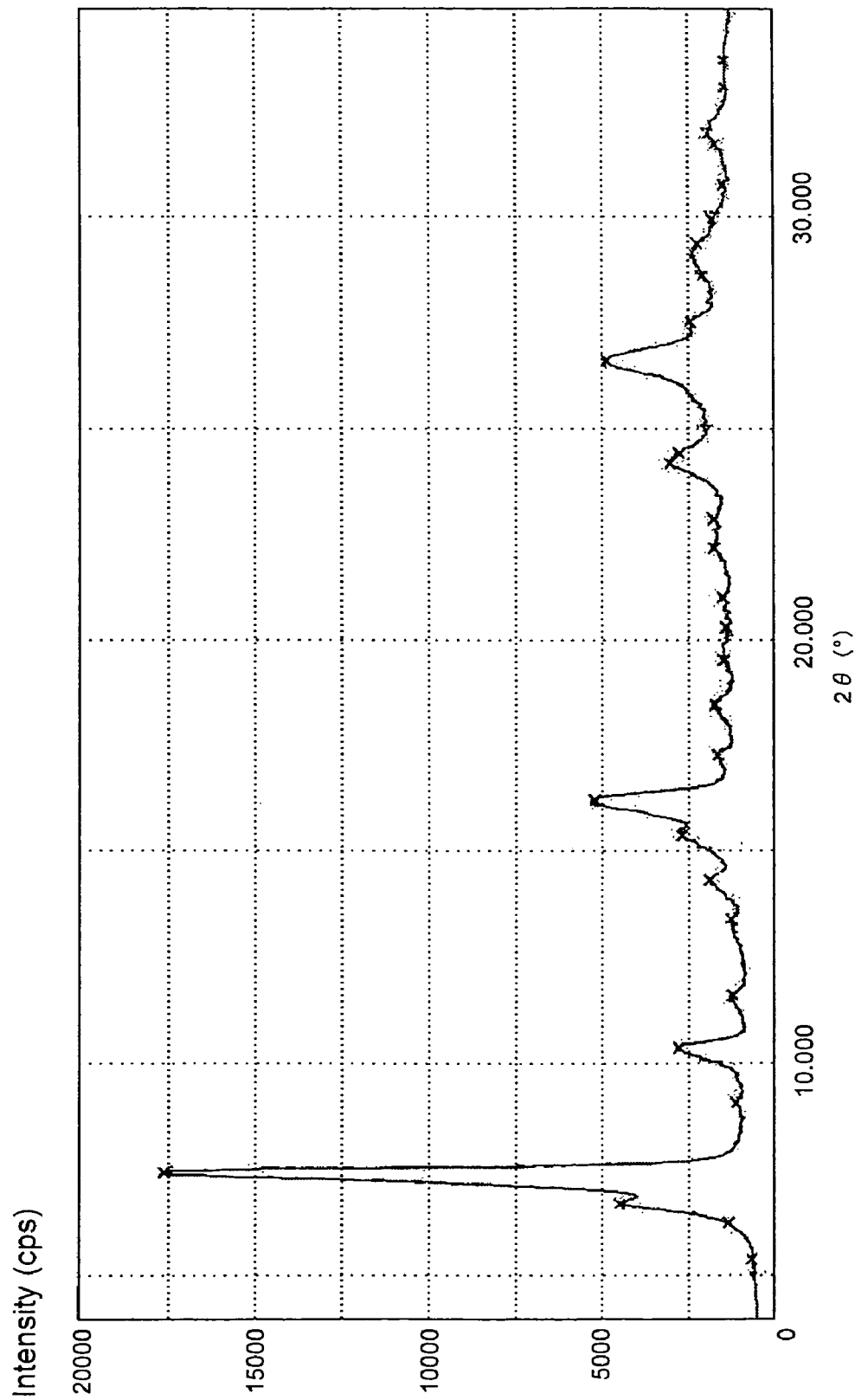
FIG. 4 An X-ray diffraction diagram of a copper tetramethylphthalocyanine crude (B-1) obtained in Production Example 6(1).
Figure 5:
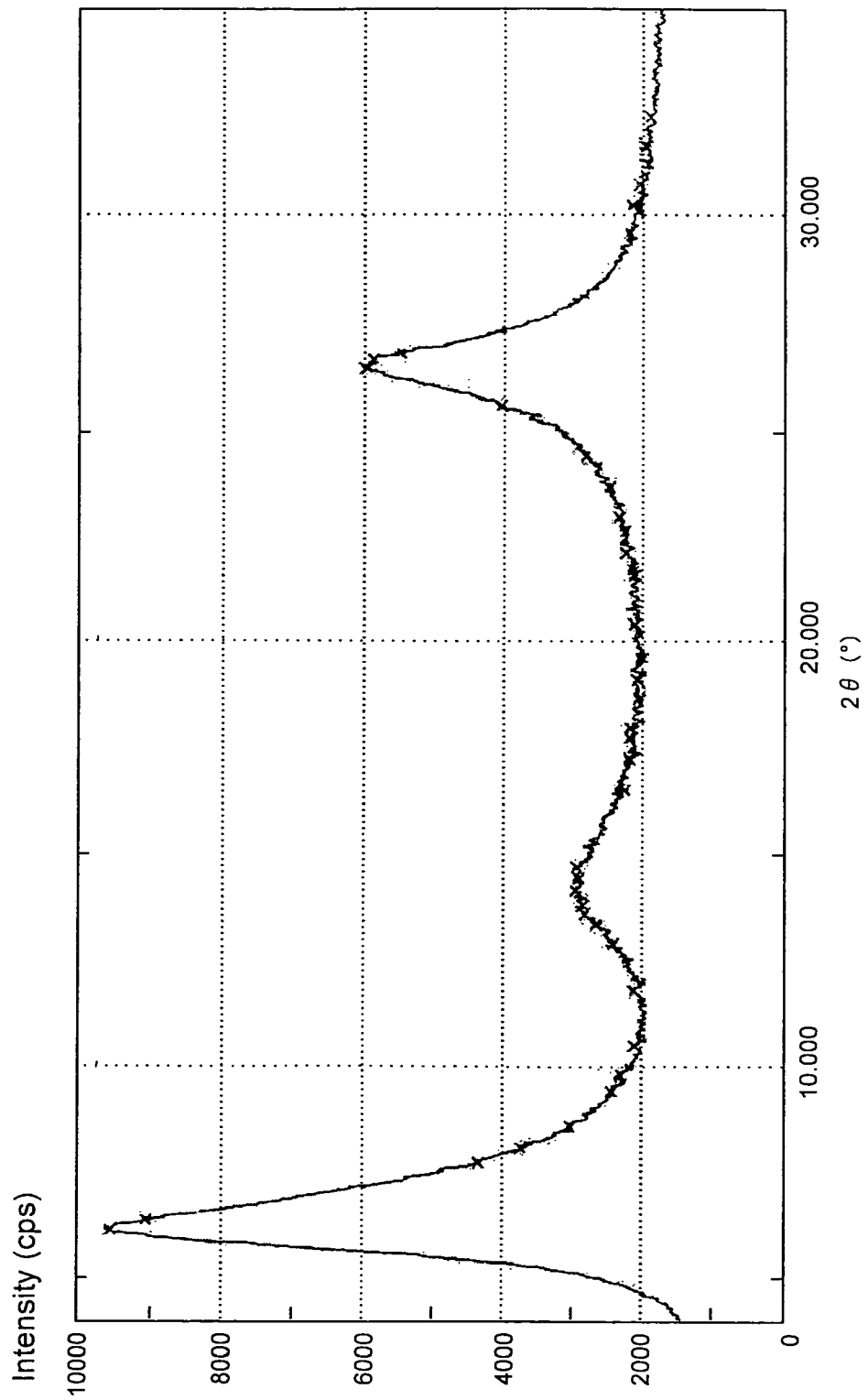
FIG. 5 An X-ray diffraction diagram of a copper tetramethylphthalocyanine pigment (B-2) obtained in Production Example 6(2).
Figure 6:
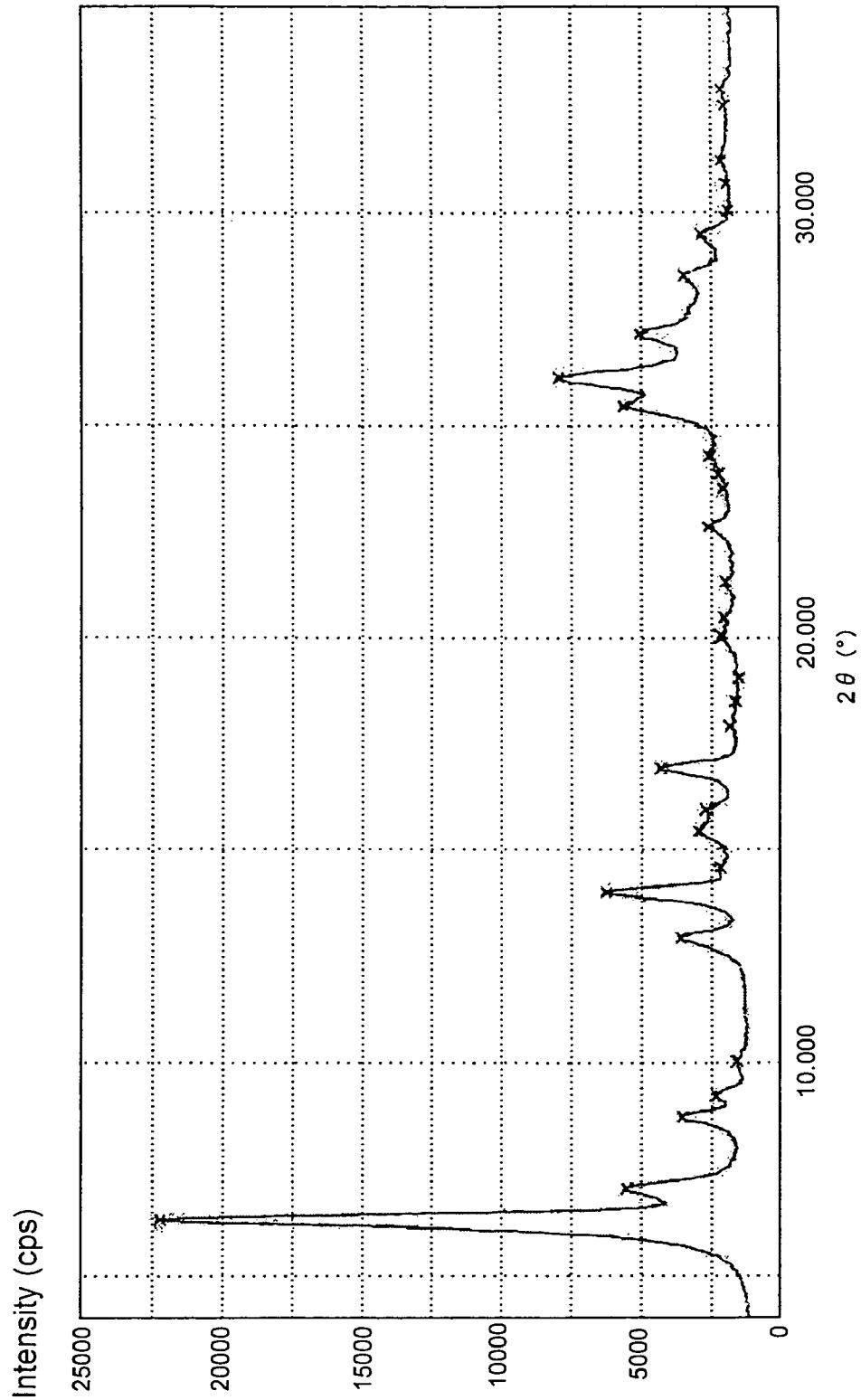
FIG. 6 An X-ray diffraction diagram of a copper tetramethylphthalocyanine pigment (B-6) obtained in Production Example 10.

The invention claimed is:

1. An image-recording/pixel-forming coloring composition comprising a copper monomethylphthalocyanine type colorant, wherein the copper monomethylphthalocyanine type colorant has at least one group selected from the group consisting of sulfonic, phthalimidomethyl, carboxyl and amino groups;

and further comprising an ε-copper phthalocyanine pigment or an unsubstituted copper monomethylphthalocyanine pigment.

2. The image-recording/pixel-forming coloring composition according to claim 1, which is a blue pixel-forming ink for color filters.

3. The image-recording/pixel-forming coloring composition according to claim 1, which is an ink for stationeries.

4. The image-recording/pixel-forming coloring composition according to claim 1, which is an inkjet ink.

\* \* \* \* \*